United States Patent [19]

Clark

[11] Patent Number: 5,149,018
[45] Date of Patent: Sep. 22, 1992

[54] COOLING SYSTEM FOR A HYPERSONIC AIRCRAFT

[75] Inventor: Larry T. Clark, Enumclaw, Wash.

[73] Assignee: The Boeing Company, Seattle, Wash.

[21] Appl. No.: 525,888

[22] Filed: May 17, 1990

[51] Int. Cl.$^5$ .............................................. B64C 1/00
[52] U.S. Cl. .................................. 244/117 A; 244/57; 244/163; 165/908; 60/912; 60/267
[58] Field of Search ............... 244/117 A, 57, 158 A, 244/163; 165/908, 169; 60/912, 266, 267

[56] References Cited

U.S. PATENT DOCUMENTS

| | | | |
|---|---|---|---|
| 2,133,514 | 10/1938 | Holmas | 165/44 |
| 2,291,607 | 8/1942 | Chaussoh | 244/57 |
| 2,330,632 | 9/1943 | Seligman | 244/57 |
| 3,550,678 | 12/1970 | Pfouts | 165/44 |
| 4,273,304 | 6/1981 | Frosch et al. | 60/267 |
| 4,505,124 | 3/1985 | Mayer | 244/117 A |
| 4,687,048 | 8/1987 | Edlestein et al. | 244/117 A |
| 4,776,536 | 10/1988 | Hudson et al. | 244/117 A |
| 4,804,571 | 2/1989 | Jouffreau | 244/117 A |
| 4,986,495 | 1/1991 | Stromath et al. | 244/158 A |

Primary Examiner—Joseph F. Peters, Jr.
Assistant Examiner—Chistopher P. Ellis
Attorney, Agent, or Firm—Seed and Berry

[57] ABSTRACT

A cooling system for a hypersonic aircraft is disclosed which enables hypersonic flight using non-cryogenic fuels. The cooling system positions a primary heat exchanger at an external location on the aircraft which remains relatively cool during hypersonic flight. A working fluid is passed through the primary heat exchanger to the hot parts of a supersonic combustion ram jet engine.

10 Claims, 4 Drawing Sheets

COOLING SYSTEM FOR A HYPERSONIC AIRCRAFT

TECHNICAL FIELD

The invention relates to apparatus and methods for cooling equipment in aircraft. More specifically, the invention relates to apparatus and methods for cooling aircraft propulsion systems.

BACKGROUND OF THE INVENTION

The ability of high speed reconnaissance aircraft to survive high-risk reconnaissance missions is increasingly dependent on the maximum cruising speed of the aircraft. The top cruising speed of a reconnaissance aircraft is directly related to its survivability because defensive systems such as interceptor missiles have a maximum effective range and a minimum response time from the detection of the incoming reconnaissance aircraft. The minimum response time and maximum effective range of a defensive interceptor missile system corresponds to a "lethal zone." The lethal zone defines an area which is inversely related to the top cruising speed of the reconnaissance aircraft. The outer boundary of the lethal zone is defined by the maximum distance from the missile site at which an incoming aircraft can be detected and effectively intercepted. For aircraft speeds above a certain threshold, the size of the lethal zone decreases to essentially zero.

The most sophisticated interceptor missile systems have a vanishingly small lethal zone for aircraft flying at speeds approximately equal to or in excess of Mach 7. Presently, hypersonic flight (flight speeds in excess of Mach 3) can only be achieved through the use of rocket propulsion systems. However, such rocket-propelled aircraft have a relatively limited range and flight duration because these aircraft must carry their own oxidizer in a cryogenically liquefied state. These aircraft are therefore unsuitable for surveillance purposes.

Aircraft designers have proposed the use of cryogenically fueled jet-propelled (i.e., air breathing) aircraft which do not carry their own oxidizer, and are thus capable of longer-duration aerial reconnaissance flights. However, cryogenic fuels require expensive and complicated handling procedures. Further, cryogenic fuels, such as hydrogen, are inherently dangerous. Therefore, the use of conventional, non-cryogenic jet fuels has attracted much attention. However, by using non-cryogenic jet fuels, the tremendous heat capacity of cryogenic fuel is not available to cool various components of the aircraft, such as the propulsion system which becomes extremely hot when the aircraft is traveling at hypersonic speeds.

At hypersonic speeds, conventional turbojet and turbofan propulsion systems are ineffective, and non-turbo machinery such as ram jets are required. Ram jets do not contain any moving parts and operate by compressing air from an air intake into a combustion chamber. While traveling through the air intake, the air is decelerated from the flight Mach number of the aircraft to a subsonic Mach number inside the engine. Fuel is then added to this compressed air in the combustion chamber and ignited. The combustion products then accelerate through an exhaust nozzle to provide the engine thrust.

As a consequence of the rapid deceleration and compression of the intake air, the temperature inside the engine rises to approximately 5000° F. This temperature is in excess of that which can be tolerated by the materials used to construct the interior surface of the engine. Thus, some active method for cooling the engine interior must be provided. In rocket engines employing cryogenic fuel, the exhaust nozzles are cooled by a flow of the cryogenic fuel through channels in the nozzle. In cryogenically fueled ram- and scram-jet engines, the hot engine parts can be cooled with the cryogenic fuel.

In ram jet engines using conventional (i.e., non-cryogenic) fuel, the heat capacity of the fuel is insufficient to cool the hot engine parts. Therefore, hypersonic flight in excess of Mach 4 using non-cryogenic fuels has not been possible.

SUMMARY OF THE INVENTION

It is an object of the invention to provide a hypersonic aircraft capable of sustained travel at speeds in excess of Mach 4 while using non-cryogenic fuel.

It is a further object of the invention to provide a hypersonic aircraft design which has an area of relatively low temperature for the radiation of excess engine heat.

The invention achieves these objects and other objects and advantages which will become apparent from the description which follows, by providing a hypersonic aircraft design which has an upper exterior portion whose surface temperature does not exceed approximately 1000° F. during flight at speeds of up to Mach 7. This exterior portion is used as a heat rejection surface for a primary heat exchanger using liquid metal as a working fluid. The liquid metal is circulated between the heat exchanger and the hot surfaces of a ram-type jet engine which propels the aircraft.

In a preferred embodiment of the invention, a secondary heat exchanger is employed to transfer heat from the heat exchange loop described above to the non-cryogenic fuel stored in the aircraft. Additional heat exchangers may be provided to transfer heat from highly compressed bleed air extracted from the engine air inlet to the liquid metal working fluid. The cooled bleed air may then be used for other cooling purposes in the aircraft.

In this preferred embodiment, the primary heat exchanger, which is located on the upper exterior portion of the aircraft, is manufactured from a titanium alloy having a plurality of channels or grooves therein, to provide a flow path for the working fluid.

Non-conventional, non-cryogenic jet fuels, such as endothermic fuels, may also be used in place of the conventional, non-cryogenic jet fuel in the above-described aircraft.

DETAILED DESCRIPTION OF THE INVENTION

Figure 1:
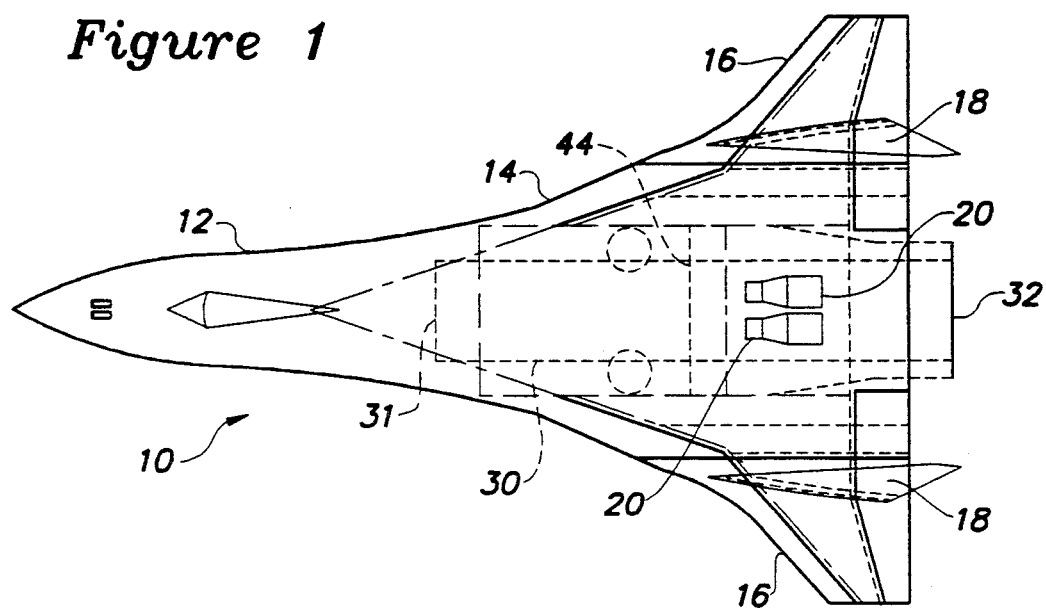
FIG. 1 is a top plan view of a hypersonic aircraft employing the cooling system of the present invention.

A non-cryogenically fueled, hypersonic reconnaissance aircraft, in accordance with the principles of the present invention, is generally indicated at reference numeral 10 in FIG. 1. The aircraft is capable of sustained cruising at high altitudes at speeds up to approximately Mach 7.

The aircraft 10 has a forward fuselage portion 12 which tapers into a delta-shaped wing section 14. The wing section 14 has a sweep angle of approximately −30° from the centerline of the fuselage. The wing section has laterally extending winglets 16, which have a sweep angle of approximately 80° from the centerline of the fuselage. The winglets have vertically mounted stabilizers 18, which cant inwardly towards the fuselage centerline at an angle of approximately 80° from the surface of the winglets 16. The fuselage 12, delta wing section 14, and winglets 16 form a substantially smooth body from all viewing angles without any substantial discontinuities.

At speeds below approximately Mach 3, the aircraft 10 is powered by twin turbojets 20, which are fueled by conventional jet fuel, such as JP4 through JP7. The engines are located substantially within the body of the wing section 14 and above a ram-jet engine, generally indicated by dashed area 30 in FIG. 1. The ram-jet engine is used for travel at hypersonic speeds above Mach 3.

The ram-jet engine 30 has at its forward end an air inlet 31 which reduces the speed of the supersonic intake air to a subsonic speed, at which location a door (not shown) selectively directs the reduced-speed air towards the turbo jets 20 for combustion to produce thrust at an exhaust end 32. The door can be moved to a position in which the turbo jets 20 are isolated from the flow of air into the ram-jet engine and in which the reduced speed intake air is directed into a combustion chamber (not shown) beneath the turbo jets 20. In this combustion chamber, the jet fuel is mixed with the highly compressed air to produce thrust at the exhaust end 32.

At speeds above Mach 3, the temperature of the supersonic air compressed by the ram-jet inlet 31 will exceed approximately 5000° F. There are currently no materials available which have the necessary structural properties to withstand the high pressure created in the ram-jet engine which can also withstand this temperature. Thus, the walls of the ram-jet engine 30 must be cooled to a temperature below approximately 2000°.

Figure 3:
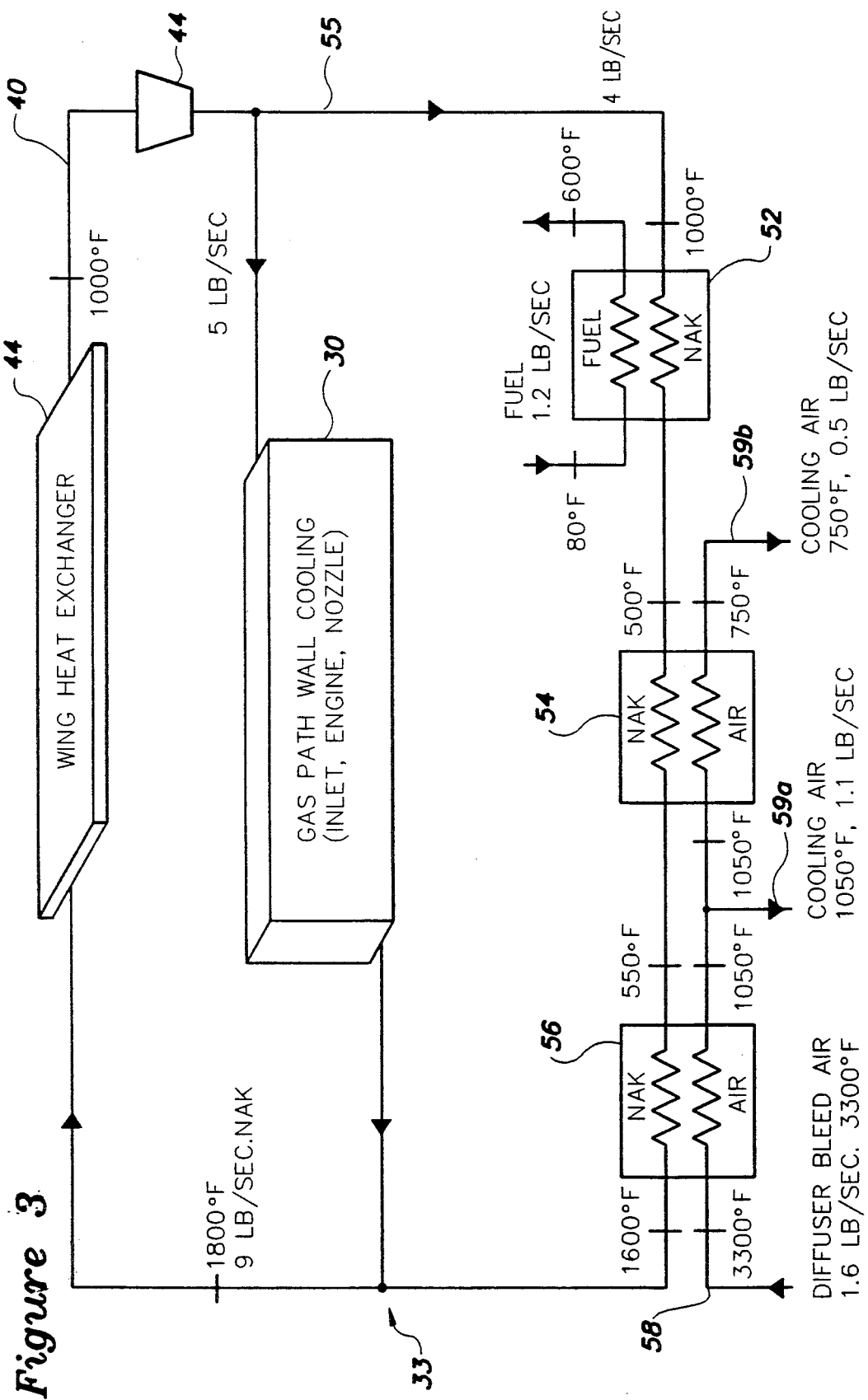
FIG. 3 is a schematic diagram of a cooling system for a combustion turbojet/ram jet engine of the aircraft of FIGS. 1 and 2.

An engine cooling system 33 is schematically shown in FIG. 3. This cooling system maintains the temperature of the interior walls of the ram engine 30 below approximately 2000° F. The cooling system 33 has a primary cooling loop 40, which includes in series a pump 44, the walls of the ram-jet engine 30 (which are in contact with the hot inlet air, combustion gas, and exhaust gas), and a wing-mounted primary heat exchanger 44.

The primary cooling loop 40 is preferably charged with a working fluid of sodium-potassium alloy (NaK) which is in a liquid state at temperatures above approximately 4° F. This fluid has a boiling point which is well in excess of 2000° F., and has a relatively large coefficient of thermal conductivity. Other liquid metals could be used as well, including organic liquids and gases, but the sodium-potassium liquid metal fluid is preferred.

The primary cooling loop has a flow rate of approximately 5 lbs of fluid per second. The wing heat exchanger 44 has a surface area of approximately 200 ft$^2$ and is placed at a location on the aircraft which does not exceed approximately 1000° F. Under these parameters, the working fluid enters the ram-jet engine 30 at a temperature of approximately 1000° F. and exits the ram-jet engine at a temperature of approximately 1800° F.

The cooling system also has a secondary cooling loop 50, which uses the heat capacity of the stored, non-cryogenic jet fuel as an additional heat sink for the primary cooling loop 33. The secondary cooling loop contains a secondary heat exchanger 52, which transfers heat energy from the secondary cooling loop to the stored fuel. The fuel enters the secondary heat exchanger at an ambient temperature of approximately 80° F. and at a flow rate of approximately 1.2 lbs/sec. The heat exchanger 52 has a surface area which is sufficiently large such that the fuel exits the secondary heat exchanger at a temperature of approximately 600° F. Additional heat exchangers 54 and 56 are provided in the secondary cooling loop to transfer heat energy from diffuser bleed air 58 (drawn from the air inlet of the ram-jet engine 30) to the NaK liquid metal flowing through the secondary cooling loop 50. The cooled air 59a and 59b, exiting these additional heat exchangers, may be used to cool other hot components of the aircraft, such as the turbojet engines 20, when the aircraft is operating at speeds below Mach 3, and when the ram-jet engine 30 is inoperative.

Figure 2:
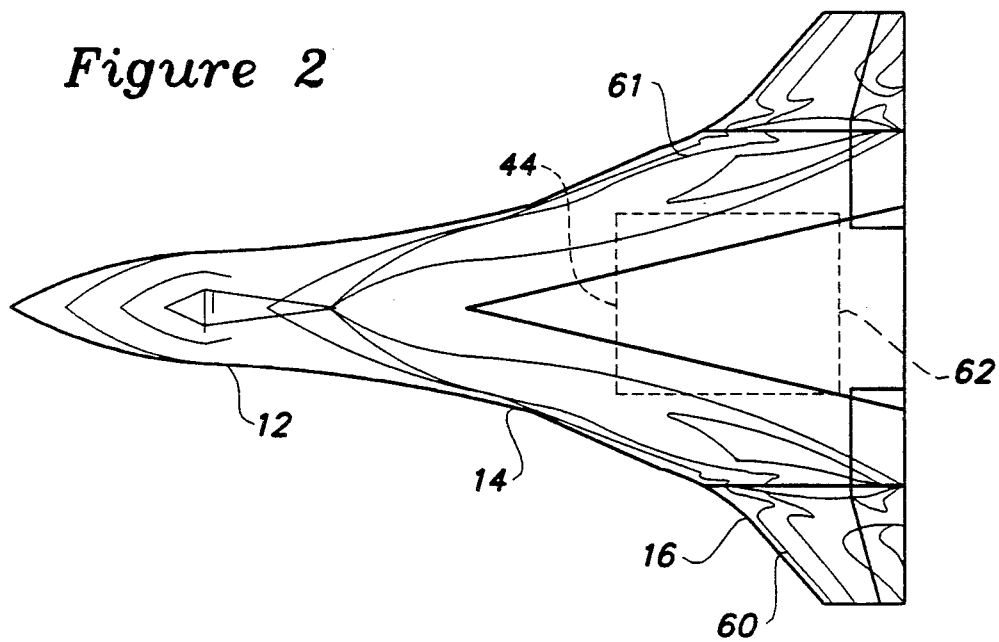
FIG. 2 is a top plan view similar to FIG. 1 showing a plurality of isothermal contours establishing the location of an upper exterior portion of the aircraft having the lowest surface temperature.

The wing heat exchanger 44 is preferably positioned at a location on the aircraft 10 which is at or below 1000° F. when the aircraft is cruising at its maximum cruise speed of approximately Mach 7. FIG. 2 illustrates isothermal regions which appear on the upper surface of the aircraft when the aircraft is travelling at a speed of Mach 7, an angle of attack of approximately 6°, a maximum dynamic pressure ($Q_{max}$) of approximately 400 lbs/ft$^2$, and an altitude of approximately 106,000 feet. The highest surface temperatures occur along the leading edge of the winglets 16, where temperatures of approximately 2850° F. are reached, as indicated by isothermal line 60. However, the area circumscribed by isothermal line 61 reaches a maximum temperature of only approximately 1000° F. even if the airflow over this upper exterior portion of the aircraft becomes turbulent. The heat exchanger 44 is therefore located at this position.

Figure 4:
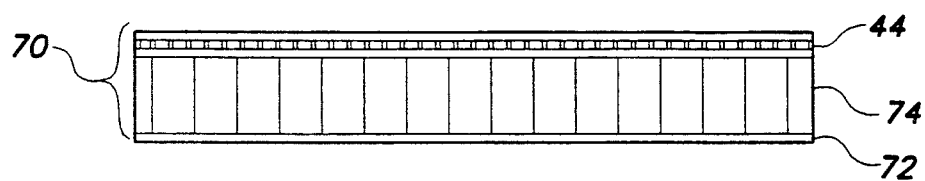
FIG. 4 is a sectional, side elevational view of the wing heat exchanger shown in FIG. 3.

FIG. 4 is an enlarged, sectional, isometric view of the wing area 62, at which the wing heat exchanger 44 is located. The heat exchanger 44 forms the upper surface of a wing section 70. The wing section also has a lower surface 72. A honeycomb core 74 is positioned between the wing heat exchanger 44 and the lower surface 72. The lower surface 72 and honeycomb core 74 may be constructed of conventional titanium alloys. However, the external surfaces of the wing heat exchanger 44, fuselage 12, delta-wing 14, winglet 16, and stabilizers 18 are preferably manufactured from a super $\alpha_{II}$ alloy of titanium to withstand the high temperatures encountered by the aircraft at maximum cruising speed.

Figure 5:
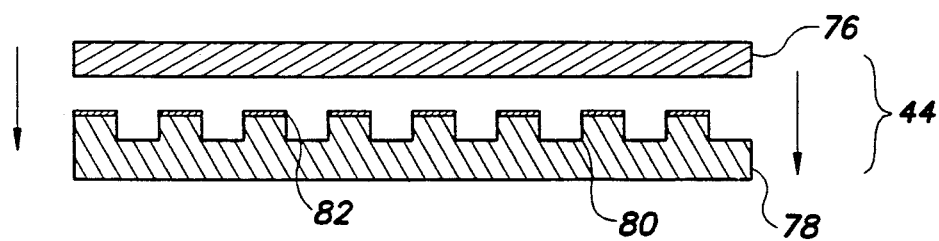
FIG. 5 is an enlarged, exploded, cross-sectional view illustrating the assembly process for the heat exchanger shown in FIG. 4.

As best seen in FIG. 5, the primary heat exchanger 44 is preferably manufactured by bonding a top sheet 76 of super $\alpha_{II}$ titanium alloy having a thickness of approximately 0.020" to a bottom sheet 78 of super $\alpha_{II}$ titanium alloy having a thickness of approximately of 0.05". The bottom sheet has grooves 80 milled therein to a depth of approximately 0.30". The top and bottom sheets 76, 78 are diffusion-bonded together so as to form welds 82 between the sheets 76, 78. The grooves 80 form channels for the passage of the NaK working fluid therethrough. The inner sidewalls of the ram-jet engine inlet, combustion chamber, and nozzle are also preferably constructed with a heat exchanger of the type shown in FIG. 5.

The cooling system 33 shown in FIG. 3, in conjunction with the aircraft design shown in FIGS. 1 and 2, permits the aircraft 10 to travel at speeds up to Mach 7, without excessive heating of the ram-jet engine 30, while using conventional, non-cryogenic jet fuels.

Figure 6:
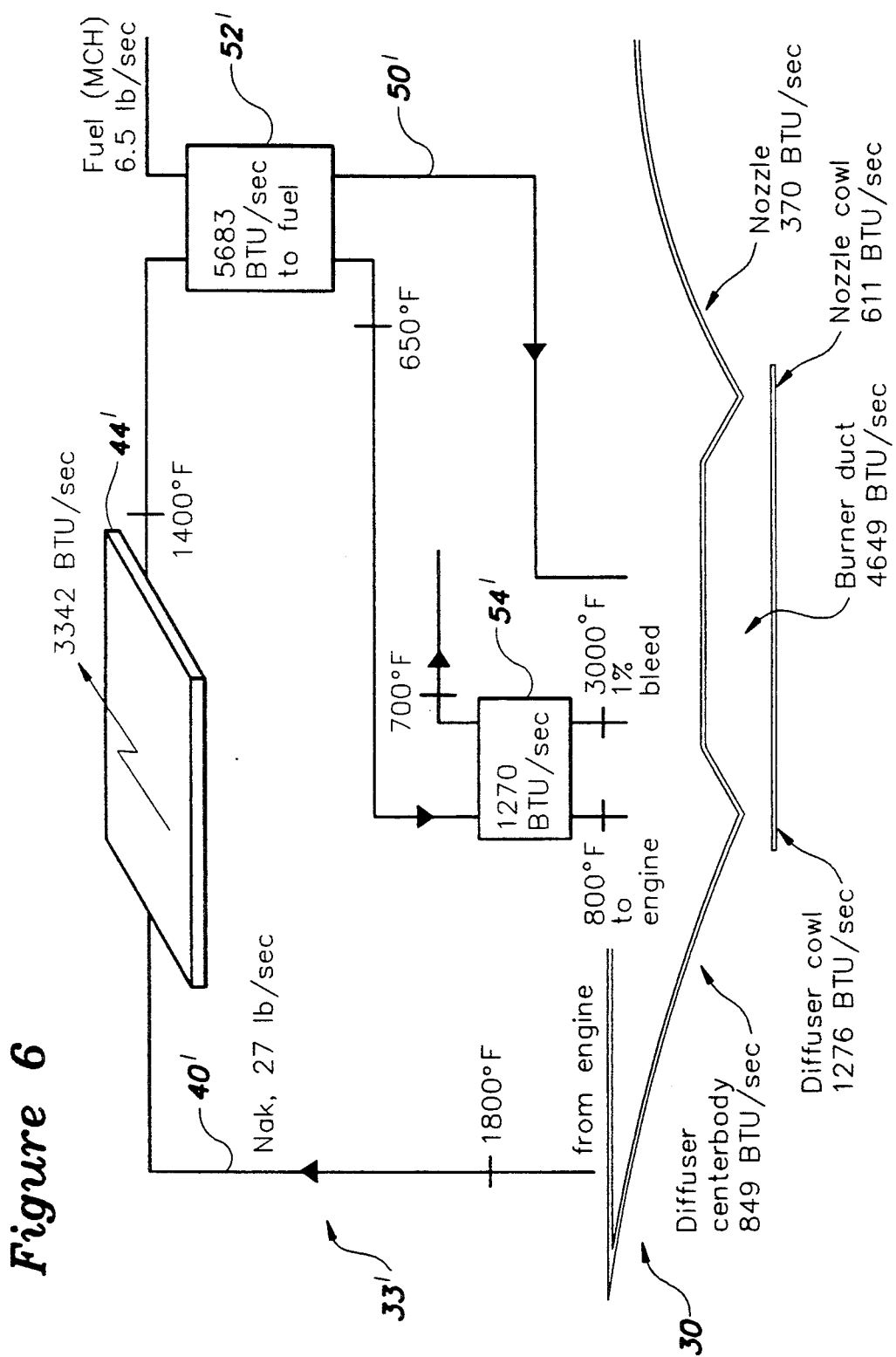
FIG. 6 is a schematic representation of an alternate embodiment of the cooling system for the aircraft, where the aircraft uses an endothermic, non-cryogenic jet fuel.

In an alternate embodiment of the invention, shown in FIG. 6, a cooling system 33' which uses a non-cryogenic, endothermic fuel (such as a methyl/cyclo hexane fuel) is used. Endothermic fuels absorb heat during combustion and thus directly cool the combustion chamber of the ram-jet engine during operation. As a result thereof, the primary heat exchanger on the wing 44 can be reduced in size or efficiency, or the performance of the aircraft 20 can be improved.

The above-described cooling systems eliminate the expense and danger of using cryogenic fuel in the aircraft and of maintaining cryogenic fuel facilities on the ground. As a result, presently existing air bases all around the world could service the above-described aircraft. The specific design of the principal and secondary cooling loops, and the size of the wing mounted primary heat exchangers 44 and 44', can be varied, as long as the hypersonic aircraft 10 is designed such that a low-temperature surface area on the aircraft is available for the rejection of excess engine heat, and as long as sufficient heat transfer capacity is available to cool the critical parts of the ram-jet engine 30. Therefore, the scope of invention is not to be limited by the above disclosure but is to be determined by the claims which follow.

I claim:

1. A cooling system for a hypersonic aircraft using non-cryogenic fuel and operable at speeds above Mach 3, comprising:

an aircraft body having a relatively low temperature exterior portion whose surface temperature does not exceed approximately 1000° Fahrenheit during flight at speeds of up to Mach 7;

a ram-type, non-cryogenic engine for propelling the aircraft;

an engine heat exchanger having a first heat exchange surface in contact with the engine and a second heat exchange surface exposed to a flow of a liquid metal;

an aircraft heat exchanger manufactured of a material capable of operating at temperatures of up to only approximately 1800° Fahrenheit, the aircraft heat exchanger being positioned in thermal contact with the relatively low temperature exterior portion of the aircraft body; and circulation means for circulating the liquid metal through the engine heat exchanger to the aircraft heat exchanger so that heat from the engine is dissipated by the aircraft exchanger to the surrounding atmosphere.

2. The cooling system of claim 1, including a non-cryogenic fuel tank for non-cryogenic fuel, a fuel heat exchanger in the fuel tank fluidly connected in parallel with the engine and aircraft heat exchangers for using the heat capacity of the fuel to cool the engine.

3. The cooling system of claim 1 wherein the aircraft heat exchanger has a first panel having a plurality of grooves therein and a second panel fixedly attached to the first panel by diffusion bonding so that the grooves form channels which are fluidly connected to the engine heat exchanger and the circulation means.

4. The cooling system of claim 3 wherein the first panel has a thickness of approximately 0.050" and wherein the second panel has a thickness of approximately 0.020".

5. The cooling system of claim 1 wherein the liquid metal working fluid is a sodium-potassium alloy.

6. The cooling system of claim 1 wherein the circulation means has a flow rate of approximately nine lb/sec and wherein the aircraft heat exchanger has a surface area of approximately 200 ft$^2$.

7. A method for cooling a ram-type jet engine using non-cryogenic fuel in a hypersonic aircraft, comprising the steps of:

circulating a liquid metal working fluid through an engine heat exchanger having a first heat exchange surface in contact with said ram-type jet engine and a second heat exchange surface exposed to a flow of said liquid metal so that heat is transferred from the engine to the working fluid;

positioning an aircraft heat exchanger in thermal contact with an external portion of the aircraft having a maximum temperature due to air friction during flight at speeds up to approximately Mach 7 of no more than approximately 1000° F.; and circulating the working fluid through the engine heat to the aircraft heat exchanger so that heat from said engine is dissipated by said aircraft heat exchanger to the surrounding atmosphere.

8. The method of claim 7, including the step of circulating at least some of the working fluid through a second heat exchanger which is in contact with the non-cryogenic fuel stored in the aircraft so that at least some of the heat energy generated in the engine is absorbed by the fuel.

9. The cooling system of claim 1 wherein said relatively low temperature exterior portion is an upper surface of a portion of said aircraft body.

10. The cooling system of claim 9 wherein said aircraft body includes a pair of wings having respective leading edges, and wherein said aircraft heat exchanger is in thermal contact with an upper surface of at least one of said wings at a location aft of the leading edge of said wing.

* * * * *